United States Patent [19]

Dinh

[11] Patent Number: 4,483,240
[45] Date of Patent: Nov. 20, 1984

[54] COOKING UTENSIL FOR DEEP FAT FRYING OF FOOD ITEMS

[76] Inventor: Tri-Trong Dinh, R.R. #2 Lot #24, N. Haven Trailer Ct., Muscatine, Iowa 52761

[21] Appl. No.: 476,067

[22] Filed: Mar. 17, 1983

[51] Int. Cl.³ .............................................. A47J 37/12
[52] U.S. Cl. ....................................... 99/407; 99/426; 99/441; 99/448; 99/450; 294/50
[58] Field of Search ................. 99/393, 394, 334, 403, 99/407, 441, 426, 427, 448, 450, 440, 409–418; D7/357, 409; 294/26.5, 50

[56] References Cited

U.S. PATENT DOCUMENTS

| | | |
|---|---|---|
| 137,142 | 3/1973 | Machlet . |
| D. 231,891 | 6/1974 | Di Pirro .............................. 99/441 |
| 1,255,014 | 1/1918 | Janiszewski .......................... 99/410 |
| 1,266,912 | 5/1918 | Bradbury . |
| 1,462,105 | 7/1923 | Hart ................................... 99/407 |
| 1,470,521 | 10/1923 | Combest . |
| 1,543,380 | 6/1925 | Harrell . |
| 1,870,735 | 8/1932 | Jones et al. . |
| 2,267,213 | 12/1941 | Newcomb . |
| 2,506,305 | 5/1950 | Maldonado . |
| 2,773,442 | 12/1956 | Contreras . |
| 2,897,745 | 8/1959 | Nichols et al. . |
| 3,301,169 | 1/1967 | Young ................................. 99/427 |
| 3,669,002 | 6/1972 | Davidson . |
| 4,173,926 | 11/1979 | Brignall . |

FOREIGN PATENT DOCUMENTS 2640627 3/1978 Fed. Rep. of Germany ........ 99/407

*Primary Examiner*—Billy J. Wilhite
*Attorney, Agent, or Firm*—Zarley, McKee, Thomte, Voorhees & Sease

[57] ABSTRACT

A cooking utensil for the deep fat frying of certain food items such as spring rolls and the like by immersion into hot liquid such as cooking oils which includes a food container with an opening for insertion and removal of the food. A piston-like member is slidably moveable within the food container, having one end abutting any food that is inserted into the container and a second end extending externally of the container. A control means, which is selectively activated by the user, causes the piston member to be positioned along a range of positions from a first position farthest away from the opening of the food container to a second position closest to the opening so that upon completion of deep fat frying, the control means can cause the piston member to slidably push the food contained in the food container at least partially out of the opening for easy removal. In another embodiment of the invention, a plurality of food containers, each having individual piston members, are secured with respect to each other so that said control means can control the slidable placement of said piston members concurrently.

10 Claims, 5 Drawing Figures

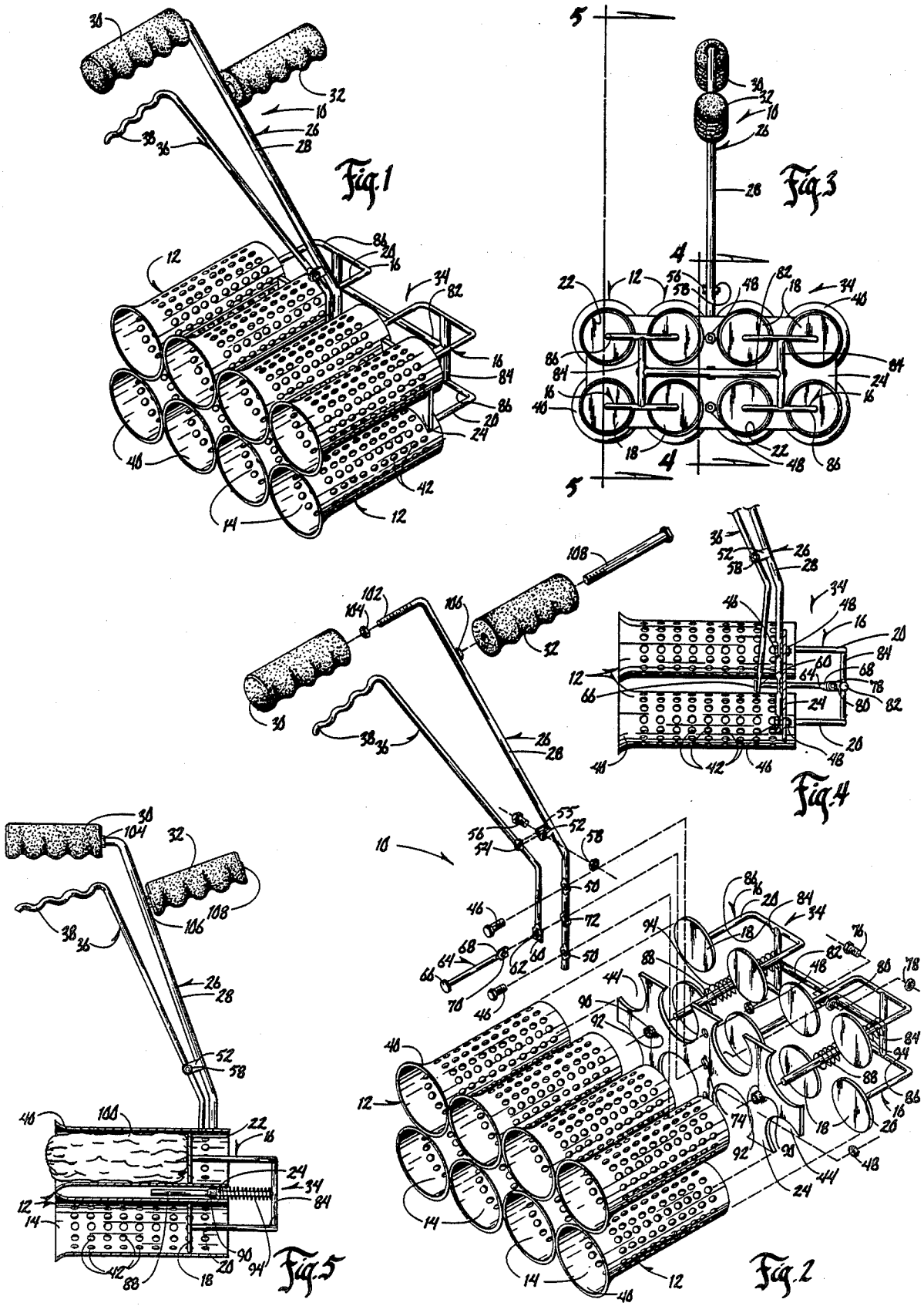

COOKING UTENSIL FOR DEEP FAT FRYING OF FOOD ITEMS

BACKGROUND OF THE INVENTION

1. Field of the Invention

This invention relates to cooking utensils, in particular, a cooking utensil for the deep fat frying of food items such as, but not limited to, Vietnamese spring rolls and for the easy removal of the same.

2. Description of the State of the Art

One method of cooking food involves submersing the food into extremely hot liquids. Deep fat frying is an example of this method and is used for many diverse different food preparations.

A distinct problem with deep fat frying involves the extremely hot temperatures and danger of spills and burns which can occur. Some devices utilize food holding chambers attached to handle members to facilitate the submersion of the food into the boiling fat. Although this removes the problem of handling the food directly, problems still exist in ensuring even cooking and in facilitating removal of the food from the container.

Other problems exist in handling and deep fat frying a number of the food items concurrently so that they may be cooked uniformly and efficiently. It is also advantageous to have a device which is easy to use, simple in construction, portable, and inexpensive.

It is therefore an object of this invention to present a cooking utensil which solves the problems in the art mentioned above.

A further object of this invention is to provide a cooking utensil which provides a safe and efficient method of deep fat frying.

A further object of this invention is to provide a cooking utensil which provides for the mechanical ejection of food articles after deep fat frying.

Another object of this invention is to provide a cooking utensil which is portable, hand operated, and easy to use and maneuver.

Another object of this invention is to provide a cooking utensil which allows for easy access of the frying medium to the food while retaining the food items in close-quartered containers.

A further object of this invention is to provide a cooking utensil which is economical and durable.

Further objects, features and advantages of the invention will become apparent with reference to the accompanying specification and drawings.

SUMMARY OF THE INVENTION

This invention utilizes a food item holding container having an opening for insertion and removal of food items. A corresponding piston member is slidably moveable within the interior of the container from a first position farthest away from the opening and over a range to a second position interiorly closest to the opening. Movement of the piston member is controlled by a means which holds the piston member in said first position combining to act as a back stop for the food item or items which are inserted into the container until deep fat frying is completed and the utensill is removed from the fat, at which time the control is operated to move the piston member toward said second position so as to eject the food item or items from the opening.

In an additional embodiment of the invention, a plurality of food item holding containers are secured with respect to one another and have individual piston members, all of which function with respect to one control means. This allows for the simultaneous deep fat frying of a number of individual food items. The control means can include an elongated handle which makes handling of the utensil safer and easier and reduces the danger of burns and spills.

BRIEF DESCRIPTION OF THE DRAWINGS

FIG. 1 is a perspective view of the invention.

FIG. 2 is an exploded perspective view of the invention.

FIG. 3 is a back elevational view of the invention.

FIG. 4 is a side view taken along lines 4—4 of FIG. 3.

FIG. 5 is a side sectional view taken along lines 5—5 of FIG. 3.

DETAILED DESCRIPTION OF THE PREFERRED EMBODIMENT

In reference to the drawings, and particularly FIG. 1, there is shown a cooking utensil 10 for the preparation of food items by deep fat frying including a plurality of food containing tubes 12 parallely and adjoiningly aligned and having first open ends 14 wherein food items such as spring rolls are inserted and removed. Piston members 16, including round, disc-shaped piston heads 18 and piston rods 20 (see FIGS. 2 and 5) extend within second open ends 22 of tubes 12 and are slidably moveable therein.

Tubes 12 are held rigidly and securely with respect to one another by tube brace plate 24. As can be seen in FIG. 2, tube brace plate 24 can be an elongated plate having slots or openings 44 through which extend tubes 12. Tubes 12 are attached to said tube brace plate 24 by soldering, welding or other securing methods.

A handle member 26 is secured to tube brace plate 24 and extends upwardly from tubes 12. Handle member 26 can comprise a handle rod 28 terminating in a handle grip 30. An additional handle grip 32 can be positioned along handle rod 28 to enable a two handed maneuvering of cooking utensil 10.

The outermost ends of piston rods 20 are attached to a control framework 34 rearward of the second open ends 22 of tubes 12. Control framework 34 adjoins the piston rods 20 so that they may be slideably and selectively moved concurrently. This is achieved by control handle 36 which is hingably attached to handle rod 28 and extends upwardly to an end 38 which is adjacent to handle grip 30. End 38 enables the user of cooking utensil 10 to control the slidable adjustment of piston members 16 while the user remains in a position away from the boiling fat.

By referring to FIG. 2, a more detailed description of the working components of this embodiment can be accomplished. Tubes 12 can be of a generally cylindrical shape and of a sufficient length to completely encase a food item such as the traditional Vietnamese spring roll which is generally cylindrical and about 4 inches long and an inch in diameter. The first open ends 14 and the second open ends 22 of tubes 12 can be aligned so they are in the same spatial planes respectively. Tubes 12 can have fluted ends 40 to more easily facilitate the insertion and removal of food items into tubes 12. Additionally, apertures 42, which can be of many various sizes and configurations, are distributed around the surface area of tubes 12 to facilitate the fluid communication of the boiling fat with the food items inside of tube 12.

Tube brace plate 24 can have uniformly spaced slots, notches or openings 44 in which tubes 12 can matingly fit in parallel and adjoining positions. Handle member 26 is attached to tube brace plate 24 by bolts 46 and nuts 48 through apertures 50 in handle rod 28 and apertures 51 in brace plate 24.

Handle grip 30 can be attached to handle member 26 by threading the upper end of handle rod 28 with threads 102. Set nut 104 and handle grip 30 can then be threaded to threads 102 and set nut 104 tightened back against handle grip 30 to secure it on handle rod 28. Handle grip 32 can be secured to handle member 26 by welding nut 106 to handle rod 28 and then inserting bolt 108 through handle grip 32 and threadably tightening it to nut 106.

Control handle 36 is hingably attached to ears 52 of handle rod 28 by bolt 56 and nut 58, with bolt 56 extending through aperture 54 and holes 55 of ears 52. A flattened end 60 on control handle 36, having a slotted aperture 62, allows pin 64, having a head 66 and a flattened end 68 with aperture 70, to pass through slotted aperture 62, slotted aperture 72 in handle rod 28, and slotted aperture 74 in tube brace plate 24. Flattened end 68 of pin 64 is then attached to control framework 34 by bolt 76 and nut 78 through ears 80.

Control framework 34, in the preferred embodiment, consists of a main crossbar 82 to which ears 80 are attached. At opposite ends of main crossbar 82 are vertical bars 84. Attached to opposite ends of vertical bars 84 are attachment bars 86 which secure piston rods 20 in spaced relation to one another.

Guide shafts 88 extend at one end from vertical bars 84, through sleeves 90 which are positioned in apertures 92 in tube brace 24. Guide rods 88 are slidably adjustable through sleeve 90 and have springs 94 positioned around them so as to provide a biasing force for framework 34 rearwardly away from tubes 12.

By referring to FIG. 3, control framework 34 is more clearly depicted. In the preferred embodiment, piston heads 18 are of a circular diameter slightly smaller than the inside diameter of tubes 12 so that piston heads 18 serve both as backstops for food items inserted into tubes 12 and also will push out any contents of tube 12 when control handle 36 is operated.

FIG. 4 shows in detailed structure the working arrangement of the control handle 36 with control framework 34. Likewise, FIG. 5 shows in greater detail the working arrangement of piston member 16 within tubes 12. Additionally, spring roll 100 is shown in its fully inserted position within tubes 12.

In operation, cooking utensil 10 works as follows. As shown in FIG. 5, spring rolls 100 are inserted into tubes 12 so that they are essentially surrounded by tubes 12. Spring 94 surrounding guide shafts 88 urge control framework 34 and therefore piston members 16 rearwardly towards the second open ends 22 of tubes 12 so that spring rolls 100 can be so inserted. Handle grips 30 and 32 are then gripped, the cooking utensil 10 is then lifted to a container with the boiling fat and the tubes 12 are submersed in the fat so that deep fat frying can occur. Apertures 42 allow the boiling liquid to surround and permeate the exterior of the spring rolls 100 to facilitate conventional deep fat frying. Upon completion of the frying process, the user grips handle grips 30 and 32 and vertically raises cooking utensil 10 out of the boiling fat. By grasping end 38 of control handle 36 and pulling upwards towards handle grip 30 with the user's fingers, control handle 36 pivots around bolt 56, flattened end 60 of control handle 36 moves away from handle rod 28 pulling pin 64 with it, and therefore pulling control framework 34 in a direction towards tubes 12. This action causes piston heads 18 to move towards first open ends 14 of tubes 12 thereby ejecting spring rolls 100 from tubes 12.

The process of deep fat frying such food items as spring rolls is thereby simplified and made less dangerous by avoiding having to handle the food items by hand or by other cooking utensils. This also allows for the more efficient cooking of a number of food items while at the same time allowing for uniform cooking of the items.

The foregoing description is that of the preferred embodiment only and does not limit the scope of the invention as defined by the following claims. For example, cooking utensils 10 could consist on one tube 12 with one piston member 16 or could consist of a plurality of tubes 12 positioned in a variety of configurations. Alternatively, tubes 12, in their cylindrical shape, could be replaced by containers of varying configurations requiring only modification of piston heads 18. Control mechanism could also take on different structural elements and configurations without falling outside the scope of the invention. Note also that different types of food items can be deep fat fried with the device depending upon the configuration the food-holding containers (tubes 12 in the preferred embodiment) take on. Control handle 36 could also take on various configurations, as could control framework 34.

Thus it can be seen that the invention achieves at least all of its stated objectives.

What is claimed is:

1. A cooking utensil for the deep fat frying of food objects such as spring rolls comprising:
    a food holding container having a first open end for insertion of said food object and having a second opposite open end;
    a piston member having a flat piston head and a piston rod attached to said piston head extending outwardly from said second open end, said piston member being slidably movable in the interior of said container;
    control means for selectively moving said piston member inwardly along the interior of said container from a first position near said second open end to a second position toward said first open end, said control means having a control framework connected to said piston rod of said piston member, a biasing means between said container and said control framework which holds said piston member at said first position, and an adjustment means which counteracts said biasing means and forces said piston member from said first position to said second position, so that when said adjustment means is not engaged, said piston member returns to said first position;
    said biasing means having a plate attached to said container, a shaft attached at one end to said control framework, a tubular journal positioned parallely with said container and transversely in said plate through which said shaft slidably passes, a spring member positioned and retained between said plate and said control framework, said spring member being in an extended position when said piston member is at said first position and being in a compressed position when said piston member is at said second position so as to urge said piston member to said first position.

2. The device of claim 1 wherein said food holding container comprises a tube.

3. A cooking utensil for the deep fat frying of food objects such as spring rolls comprising:
a plurality of food holding containers, each having a first open end for insertion of said food object and having a second opposite open end;
a piston member within each said container having a flat piston head and a piston rod attached to said piston head extending outwardly from each said second open end, said piston members being slidably movable within the interiors of said containers; and
control means for selectively moving said pistons inwardly along the interiors of said containers from a first position near said second open ends to a second position towards said first open ends, said control means having a control framework connected to each said piston rod of each said piston member, biasing means between said tubes and said control framework which holds said piston members at said first position, and adjustment means which counteract said biasing means and forces said piston members from said first position to said second position, so that when said adjustment means is not engaged, said piston members return to said first position;
said biasing means having a plate attached to said containers, a plurality of shafts each attached at one end to said control framework, a plurality of tubular journals corresponding to the number of said shafts positioned parallely with said containers and transversely in said plate and through which said shafts are slidably engaged, a plurality of spring members corresponding to each said shaft positioned and retained between said plate and said control framework, each said spring being in an extended position when said piston members are at said first position and being in a compressed position when said piston members are at said second position.

4. The device of claim 3 wherein said food holding containers comprise tubes.

5. A cooking utensil for the deep fat frying of food objects such as spring rolls comprising:
a food holding container having an attached plate and having a first open end for insertion of said food object and having a second opposite open end;
a piston member having a flat piston head and a piston rod attached to said piston head extending outwardly from said second open end, said piston member being slidably movable within the interior of said container;
a handle member attached to and extending outwardly from said container;
control means for selectively moving said piston member inwardly along the interior of said container from a first position near said second open end to a second position towards said first open end, said control means having a control framework connected to said piston rod of said piston member;
a control lever operably connected to said control means and being operable from said handle member, said control lever comprising an elongated pole having a lower end and an upper end and extending generally co-parallely with said handle member upwardly from said plate and being hingably attached at a hingepoint to said handle between said lower and said upper end, a pin having a head and tail attached at said head to said lower end of said elongated pole and slidably extending through said plate to where said tail is removably and hingably attached to said control framework, so that by manually pivoting said elongated pole about said hingepoint on said handle, said pin pulls said control framework towards said container so that said piston member moves from said first position to said second position.

6. The device of claim 5 wherein said food holding container comprises a tube.

7. The device of claim 5 wherein said cooking utensil comprises a plurality of spring roll holding containers, each having a said piston member slidably movable within the interior of each said container in response to said control means.

8. A cooking utensil for the deep fat frying of food objects such as spring rolls by manually submerging said food objects into a liquid cooking medium, comprising:
a food holding container having a first open end for insertion of said food object and having a second opposite open end;
a handle attached to said container and extending outwardly from said container;
a piston member having a flat piston head and a piston rod attached to said piston head extending outwardly from said second end, said piston member being slidably movable within the interior of said container; and
control means for selectively moving said piston member inwardly along the interior of said container from a first position near said second open end to a second position toward said first open end, said control means having a control lever extending upon said handle;
a bias means to hold said piston member at said first position until operation of said control lever, said bias means causing said piston member to return to said first position upon release of said control lever;
said container having means to allow deep fat frying liquid to surround said food object.

9. The device of claim 8 wherein said cooking utensil comprises a plurality of food holding containers, each having a said piston member slidably movable within the interior of each said container in response to said control means.

10. The device of claim 8 wherein said means to allow said deep fat frying liquid to surround said food objects comprises apertures along the walls of said food holding containers.

* * * * *